United States Patent
Jia et al.

(10) Patent No.: US 12,307,696 B1
(45) Date of Patent: May 20, 2025

(54) STRUCTURED LIGHT THREE-DIMENSIONAL MEASUREMENT METHOD BASED ON JOINT MULTI-FREQUENCY HETERODYNE AND TIME-GATED OVERLAPPING CODING STRATEGY

(71) Applicant: Hangzhou Chengguang Medical Technology Co., Ltd., Zhejiang (CN)

(72) Inventors: Mengyu Jia, Zhejiang (CN); Boshuai Sun, Zhejiang (CN)

(73) Assignee: Hangzhou Chengguang Medical Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/914,858

(22) Filed: Oct. 14, 2024

(30) Foreign Application Priority Data

Jan. 30, 2024 (CN) .......................... 202410126225.5

(51) Int. Cl.
*G06T 7/521* (2017.01)
*G01B 9/02* (2022.01)
*G01B 11/24* (2006.01)

(52) U.S. Cl.
CPC .......... *G06T 7/521* (2017.01); *G01B 9/02044* (2013.01); *G01B 11/2441* (2013.01); *G06T 2207/10028* (2013.01)

(58) Field of Classification Search
CPC ...................... G06T 2207/10028; G06T 7/521
See application file for complete search history.

(56) References Cited

U.S. PATENT DOCUMENTS

| | | | |
|---|---|---|---|
| 2005/0088745 A1* | 4/2005 | Cathey | G02B 27/50 359/568 |
| 2012/0281087 A1* | 11/2012 | Kruse | G01B 11/25 348/136 |

(Continued)

FOREIGN PATENT DOCUMENTS

| | | |
|---|---|---|
| CN | 114018176 A | 2/2022 |
| CN | 114526692 A | 5/2022 |

(Continued)

*Primary Examiner* — Jayanti K Patel
*Assistant Examiner* — Christopher Kingsbury Glover

(57) ABSTRACT

Disclosed is a structured light three-dimensional measurement method based on joint multi-frequency heterodyne and time-gated overlapping coding strategy. Specifically, fringe images modulated by a target surface are firstly collected and processed to obtain corresponding wrapped phase maps according to the phase-shifting method. Then, the wrapped phase maps are re-organized following the time-gated overlapping coding strategy, and further proceeded to obtain corresponding multi-frequency heterodyne unwrapped phase maps. With the unwrapped phase maps, a corresponding three-dimensional point cloud can be derived with the calibration parameters. The present application uses multi-frequency heterodyne method for phase unwrapping, promising high stability of phase-unwrapping and high measurement accuracy. Furthermore, the temporal correlation among the fringe images is fully exploited by the proposed time-gated overlapping coding strategy to further improve the measurement accuracy. Besides, only a few sinusoidal fringe images need to be used to complete one single measurement, highly promoting the measuring speed.

6 Claims, 2 Drawing Sheets

(56) References Cited

U.S. PATENT DOCUMENTS

| | | | |
|---|---|---|---|
| 2015/0070472 A1* | 3/2015 | Chen | G01B 11/2531 |
| | | | 348/47 |
| 2015/0109423 A1* | 4/2015 | Shimodaira | H04N 13/254 |
| | | | 348/49 |
| 2019/0271540 A1* | 9/2019 | Da | G06T 7/50 |
| 2019/0379881 A1* | 12/2019 | Tewes | H04N 13/254 |

FOREIGN PATENT DOCUMENTS

| | | |
|---|---|---|
| CN | 116399254 A | 7/2023 |
| WO | 2022198974 A1 | 9/2011 |

\* cited by examiner

STRUCTURED LIGHT THREE-DIMENSIONAL MEASUREMENT METHOD BASED ON JOINT MULTI-FREQUENCY HETERODYNE AND TIME-GATED OVERLAPPING CODING STRATEGY

CROSS-REFERENCE TO RELATED APPLICATION

This application claims priority of Chinese Patent Application No. 202410126225.5, filed on Jan. 30, 2024, the entire contents of which are incorporated herein by reference.

TECHNICAL FIELD

The present application relates to the technical field of optical measurement and, more particularly, to a structured light three-dimensional measurement method based on joint multi-frequency heterodyne and time-gated overlapping coding strategy.

BACKGROUND

Structured light imaging is a method that captures the three-dimensional topography of a surface using specific patterns of light. It maintains various advantages including easy implementation, non-contact, speediness, high precision, low cost, etc., and is widely applied in industrial production, medical imaging and computer vision.

At present, multiple phase-shifting patterns are widely used in structured light three-dimensional measurement methods to calculate the three-dimensional morphology. Particularly, in a structured light three-dimensional measurement method, a single-frequency phase-shifting fringe pattern set and a Gray code pattern are used and re-arranged in time domain. Due to the limited frames of image to be used in one single measurement, high-speed three-dimensional topography that is necessary for dynamic recording is promised. The Gray code pattern herein is used for the phase unwrapping, which, however is complex in computation and requires high hardware performance. Besides, the phase-shifting fringe images that contain only a single frequency typically lead to poor stability of phase-unwrapping.

SUMMARY

In view of this, the present application proposes a structured light three-dimensional measurement method based on joint multi-frequency heterodyne and time-gated overlapping coding strategy. The goal is to improve the stability of phase-unwrapping while maintaining the advantages in existing structured light three-dimensional measurement methods that utilize single-frequency phase-shifting fringe images.

To this end, the present application provides the following solutions.

Preferably, the method is applied to a structured light three-dimensional measurement system. The system includes a computation module, a projector module and an image acquisition module. The three-dimensional measurement method includes:

generating at least two groups of sinusoidal fringe images that have a fixed number of phase-shifting steps but different spatial frequencies by using the computation module, and uploading a sinusoidal fringe image set to the projector module;

projecting images collected from the sinusoidal fringe image set onto an interrogated target in a continuous loop by using the projector module;

synchronously capturing fringe images modulated by a surface of the target by using the image acquisition module, and uploading the same to the computation module;

grouping images in the fringe image set according to the number of phase-shifting steps by using the computation module, and calculating a wrapped phase map pertained to each group of fringe images by using the phase-shifting method to obtain a wrapped phase map sequence;

extracting each wrapped phase map by using the time-gated overlapping coding strategy, and sorting the wrapped phase maps according to the spatial frequency to obtain a target wrapped phase map;

calculating an unwrapped phase map obtained from the phase map set by using the multi-frequency heterodyne method to obtain an unwrapped phase map sequence; and computing a three-dimensional point cloud from each of the unwrapped phase maps according to the properties of similar triangles in conjunction with calibration parameters.

Preferably, extracting each wrapped phase map by using the time-gated overlapping coding strategy includes:

extracting wrapped phase maps with the number of M ranging from a $(z-M+1)^{th}$ wrapped phase map to a $z^{th}$ wrapped phase map, $z=(M, M+1, M+2, \ldots, k \times M)$, M being the number of spatial frequencies and $k(=1, 2, 3, \ldots, +\infty)$ representing the number of cyclically projecting loops.

Preferably, calculating the wrapped phase map pertained to each group of fringe images by using the phase-shifting method includes:

calculating a wrapped phase map pertained to each group of fringe images according to Formula 1, $$\theta(x, y) = \arctan\left(\frac{\sum_{n=o}^{N-1} I_n(x, y)\sin(2\pi n/N)}{\sum_{n=o}^{N-1} I_n(x, y)\cos(2\pi n/N)}\right), \quad \text{(Formula 1)}$$

where (x,y) represents a pixel coordinate; N is the number of phase-shifting steps; and $I_n$ (n=0, 1 ..., N−1) represents the fringe images in each group.

Preferably, calculating the unwrapped phase map pertained to each target wrapped phase map set by using the multi-frequency heterodyne method includes:

calculating the heterodyne phase map between any two wrapped phase maps at different spatial frequencies in the target wrapped phase map set; and performing weighted averaging on the heterodyne phase pertained to each spatial frequency to obtain the unwrapped phase map according to the averaging-error effect.

Preferably, calculating the heterodyne phase between any two wrapped phases with different spatial frequencies in a target wrapped phase map set includes:

calculating the unwrapped phase map pertained to the target wrapped phase map set according to Formula 3;

$$\Phi_m = \begin{cases} [\varphi_1, \varphi_2, \varphi_3, \ldots, \varphi_M], m = 1 \\ \text{round}\left(\left(\frac{\Phi_1}{h_m} \times h_1 - \varphi_m\right)/2\pi\right) \times 2\pi + \varphi_m, m = 2, 3, \ldots, M \end{cases}$$ (Formula 3)

where [•, •, . . . , •] represents the multi-frequency heterodyne phase unwrapping operation and round[•] represents a rounding function, M being the number of spatial frequencies; $\varphi_m$ (m=1, 2, . . . , M) and $\Phi_m$ (m=1, 2, . . . , M) represent the wrapped phase maps and heterodyne unwrapped phase maps pertained to spatial frequencies $h_m$ (m=1, 2, . . . , M), respectively.

Preferably, performing weighted averaging on the heterodyne phase pertained to each of the spatial frequencies in the heterodyne phase set according to the averaging-error effect includes:

performing, according to Formula 4, weighted averaging on the heterodyne phase pertained to each of the spatial frequencies in the heterodyne phase set, $$\Phi = \frac{\sum_{m=1}^{M} \Phi_m}{\sum_{m=1}^{M} \frac{1}{hm}}$$ (Formula 4)

where $\Phi$ is the final result of multi-frequency phase unwrapping, M is the number of spatial frequencies; $\varphi_m$ (m=1, 2, . . . , M) and $\Phi_m$ (m=1, 2, . . . , M) represent the wrapped phase maps and heterodyne unwrapped phase maps pertained to spatial frequencies $h_m$ (m=1, 2, . . . , M), respectively.

It can be found from the above technical solutions that the present application proposes a structured light three-dimensional measurement method based on joint multi-frequency heterodyne and time-gated overlapping coding strategy. The computation module generates at least two groups of sinusoidal fringe images that maintain a fixed number of phase-shifting steps but different spatial frequencies to obtain a sinusoidal fringe image set. The projector module projects the sinusoidal fringe images collected from the sinusoidal fringe image set onto an interrogated target in a continuous loop. The image acquisition module synchronously collects fringe images modulated by a surface of the target to obtain a fringe image set. The computation module groups the fringe images collected from the fringe image set according to the number of phase-shifting steps, and calculates the wrapped phase map pertained to each group of the fringe images according to the phase-shifting method to obtain a wrapped phase map sequence. The wrapped phase maps are firstly extracted with the time-gated overlapping coding strategy. And then, the wrapped phase maps are sorted according to the spatial frequency to obtain a set pertained to a target. Subsequently, the phases are unwrapped by using the multi-frequency heterodyne method. Finally, the unwrapped phase map sequence in conjunction with the calibration parameters are used to obtain a three-dimensional point cloud sequence by taking the properties of similar triangles. The present application proposes a measurement method that uses a series of sinusoidal fringe images at different spatial frequencies, the temporal correlation among the fringe images is fully exploited by the proposed time-gated overlapping coding projection strategy to further improve the measurement accuracy. Furthermore, the present application uses multi-frequency heterodyne method for phase unwrapping, promising high stability of phase-unwrapping and high measurement accuracy. Besides, only a few sinusoidal fringe images need to be used to complete one single measurement, highly promoting the measuring speed. At last, the phase unwrapping is achieved with the developed multi-frequency heterodyne method, which maintains lightweight computation and low-cost hardware.

BRIEF DESCRIPTION OF THE DRAWINGS

To clarify the technical solution in the present application or other existing technologies, a brief description on the attached drawings that are used in the present application or other existing technologies is given below. The drawings attached below are used only in the present application. To the technicians in this community, they could make similar drawings other than those attached below without taking creative efforts.

DETAILED DESCRIPTION

Technical solutions in the present application will be specifically described as below by using the drawings attached. Obviously, the examples described below are only a part of those in the present application. All the examples that are based on the one proposed in the present application and made by the technicians in this community without taking creative efforts are within the scope of protection claimed in the present application.

Figure 1:
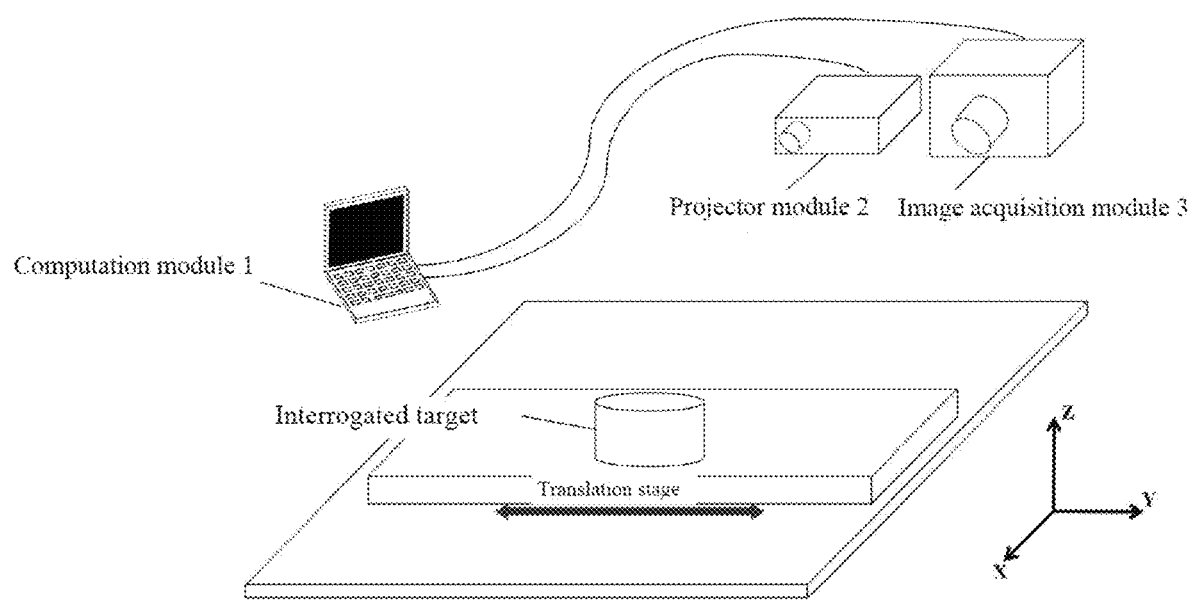
FIG. 1 is a diagram showing a three-dimensional measurement system proposed in the present application.

FIG. 1 exemplifies an application of the structured light three-dimensional measurement system described in present application. The three-dimensional measurement system includes a computation module 1, a projector module 2 and an image acquisition module 3. Specifically, the computation module 1 is but not limited to a personal computer, the projection module 2 is but not limited to a commercial projector, and the image acquisition module 3 is but not limited to an industrial camera. In addition, a translation stage is included to allow for dynamic measurement on a moving target mounted on the stage. The workflow is briefly described as below. Firstly, the projector and the camera are placed in parallel to maximize the common field of view in between. Then, the internal parameters of the camera and the projector as well as the relative position relationship between the camera and the projector are calibrated. In the calibration process, the relative position between the projector and the camera is fixed.

Figure 2:
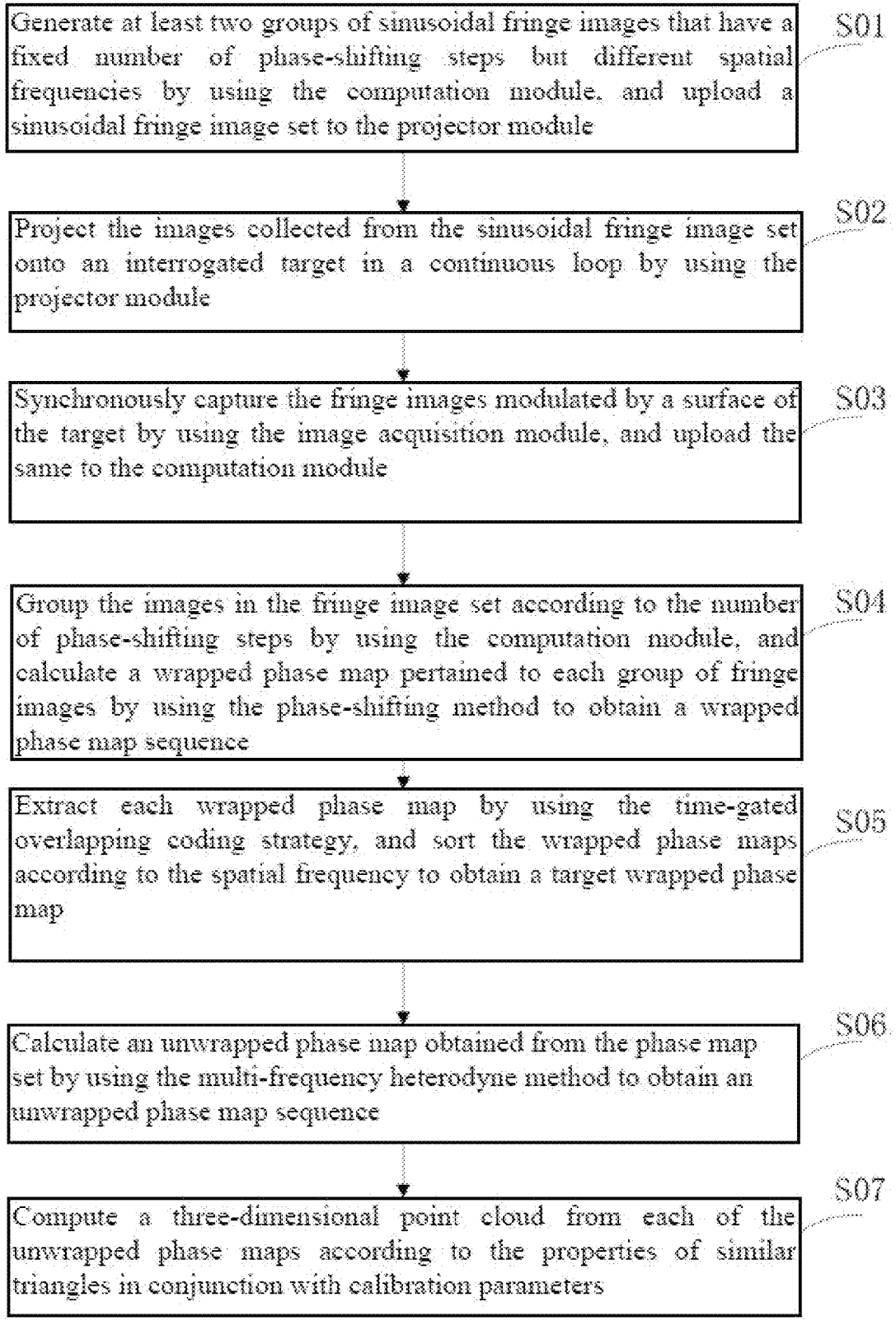
FIG. 2 is a flowchart depicting a structured light three-dimensional measurement method based on joint multi-frequency heterodyne and time-gated overlapping coding strategy proposed in the present application.

The principle of the structured light three-dimensional measurement method based on joint multi-frequency heterodyne and time-gated overlapping coding strategy in the present application is introduced. As shown in FIG. 2, the three-dimensional measurement method includes the following steps.

In step S01, the computation module generates at least two groups of sinusoidal fringe images that maintain a fixed number of phase-shifting steps but different spatial frequencies, and uploads the same to the projector module.

Specifically, the computation module 1 generates a set of sinusoidal fringe images with a total of M spatial frequencies and N phase-shifting steps. Then, the generated image set is uploaded to the projector module 2. Take the sinusoidal structured light that contains three spatial frequencies (i.e., M=3) and four phases (i.e., N=4) as an example, the size of projection pattern is set to be the same as the inherent resolution of the projector (i.e., 1140×912), and the three spatial frequencies are 1/36, 1/35, and 1/30, respectively. An 8-bit sinusoidal fringe image can be generated according to Formula 1, $$I_{p,n}(u, v) = 127.5 + 127.5 \times \cos\left[\frac{2u\pi}{p} + \frac{0v\pi}{p} + \frac{(n-1)\pi}{2}\right] \quad \text{(Formula 1)}$$

where $p(\in\{36,35,30\})$ is the reciprocal of spatial frequency pertained to the sinusoidal fringe image, i.e., the number of fringes in the sinusoidal fringe image; $n(\in\{1,2,3,4\})$ represents the number of phase-shifting steps; and (u,v) represents the coordinate of a pixel of the sinusoidal fringe image with u=1, 2, . . . , 1140 and v=1, 2, . . . , 912. The sinusoidal fringe images are re-organized in a sequence of $I_{36,1}$, $I_{36,2}$, $I_{36,3}$, $I_{36,4}$, $I_{35,1}$, $I_{35,2}$, $I_{35,3}$, $I_{35,4}$, $I_{30,1}$, $I_{30,2}$, $I_{30,3}$, $I_{30,4}$, and uploaded to the projector module 2.

In step S03, the image acquisition module that is synchronized to the projector module captures the fringe images modulated by the target surface, and uploads the same to the computation module.

Specifically, each sinusoidal fringe image that projected by the projector module 2 is modulated by the target surface, and is simultaneously captured by the image acquisition module 3. Then, the captured sinusoidal fringe images are uploaded to the computation module 1. For example, the sinusoidal fringe images that captured by the image acquisition module 3 and uploaded to the computation module 1 can be expressed as $\{I_1', I_2', I_3', \ldots, I_L'\}$ with a length of L(=3×4×k), where k(=1, 2, 3, . . . , +∞) represents the number of cyclically projecting loops.

In step S04, the fringe images that are uploaded to the computation module are grouped according to the number of phase-shifting steps to calculate the corresponding wrapped phase map by using the phase-shifting method.

Specifically, the computation module 1 groups the fringe images that are uploaded from the image acquisition module 3 according to the spatial frequency. Subsequently, each group the fringe images that is pertained to a specific spatial frequency is used to calculate the wrapped phase map by using the phase shifting method. Take the sinusoidal structured light that contains three spatial frequencies (i.e., M=3) and four phases (i.e., N=4) as an example, the four fringe images pertained to a fixed spatial frequency are grouped together. Assuming that cyclic projections are performed with the number of loops being k, a total of S(=M×k) groups that have N target-modulated sinusoidal fringe images can then be obtained. Following the phase-shifting method, the wrapped phase maps pertained to each group of sinusoidal fringe images can be calculated. Specifically, the wrapped phase maps $\{\theta_1, \theta_2, \theta_3, \ldots, \theta_S\}$ can be calculated according to Formula 2

$$\theta_s(x, y) = \arctan\left(\frac{I_{s,4}(x, y) - I_{s,2}(x, y)}{I_{s,1}(x, y) - I_{s,3}(x, y)}\right), s = 1, 2, 3, \ldots, S$$

where (x,y) represents a pixel coordinate of a fringe image; $\{I_{s,1}, I_{s,2}, I_{s,3}, I_{s,4}\}$ represent the fringe images in a group with a fixed spatial frequency but varied number of phase-shifting steps.

In step S05, the wrapped phase maps are firstly extracted by using the time-gated overlapping coding strategy, and then are sorted according to the spatial frequency.

Specifically, the wrapped phase maps that correspond to each of the fringe image groups are extracted. And then, these wrapped phase maps are sorted in ascending order of the spatial frequency, representing the phase maps that account for one complete measurement ($\psi$).

In step S06, the unwrapped phase maps that corresponds to each set of wrapped phase maps are calculated based on the multi-frequency heterodyne method.

Specifically, the unwrapped phase maps that corresponds to each set of wrapped phase maps are calculated based on the multi-frequency heterodyne method. The number of the unwrapped phase maps is M(k−1)+1, equal to that of the measurements ($\psi$).

In step S07, the unwrapped phase maps combined with the calibration parameters are used to calculate the corresponding three-dimensional point clouds according to the properties of similar triangles.

Specifically, the three-dimensional point clouds are calculated by using the unwrapped phase maps together with the parameters of both the camera and projector confirmed by the pre-calibration process. The total number of the point cloud results is M(k−1)+1.

The present application provides a method of structured-light three-dimensional measurement that utilizes the joint multi-frequency heterodyne and time-gated overlapping coding strategy. The computation module generates a series of sinusoidal fringe images with a fixed number of phase-shifting steps but varied spatial frequencies (two kinds at least). Firstly, the projector module projects the sinusoidal fringe images onto the interrogated target in a continuous loop. Then, the image acquisition module synchronously collects the fringe images modulated by the target. Subsequently, the fringe images are grouped in the computation module according to the number of phase-shifting steps, and processed to obtain the corresponding wrapped phase maps according to the phase-shifting are re-organized based on the time-gated overlapping coding strategy and sorted according to the spatial frequency. Moreover, the wrapped phase maps are used to calculate the corresponding unwrapped phase maps by using the multi-frequency heterodyne method. Finally, each of the unwrapped phase map sets is used to derive the corresponding three-dimensional point cloud by using the properties of the similar triangles in conjunction with the calibration parameters. The present application proposes a measurement method that uses a series of sinusoidal fringe images at different spatial frequencies, the temporal correlation among the fringe images is fully exploited by the proposed time-gated overlapping coding projection strategy to further improve the measurement accuracy. Furthermore, the present application uses multi-frequency heterodyne method for phase unwrapping, promising high stability of phase-unwrapping and high measurement accuracy. Besides, only a few sinusoidal fringe images need to be used to complete one single measurement, highly promoting the measuring speed. At last, the phase unwrapping is achieved with the developed multi-frequency heterodyne method, which maintains lightweight computation and low-cost hardware.

The example of the present application introduces the process of calculating an unwrapped phase corresponding to the target wrapped phase set based on a multi-frequency heterodyne method to obtain an unwrapped phase sequence in step S06.

In step S061, a heterodyne phase between any two wrapped phases with different spatial frequencies in the target wrapped phase set is calculated to obtain a heterodyne phase set.

Specifically, assuming that $\varphi_1, \varphi_2, \ldots, \varphi_M$ are the wrapped phase maps with $h_1, h_2, \ldots, h_M$ being the corresponding spatial frequencies sorted in descending order. $\Phi_1$ is the multi-frequency heterodyne phase-unwrapping result that unwrapped with wrapped phase map $\varphi_1$. The unwrapped phase maps that correspond to each set of the target wrapped phase maps $\Phi_m$ (m=1, 2, 3, ..., M) are calculated following formula 3

$$\Phi_m = \begin{cases} [\varphi_1, \varphi_2, \varphi_3, \ldots, \varphi_M], & m = 1 \\ \text{round}\left(\left(\frac{\Phi_1}{h_m} \times h_1 - \varphi_m\right)/2\pi\right) \times 2\pi + \varphi_m, & m = 2, 3, \ldots, M \end{cases} \quad \text{(Formula 3)}$$

where $[\bullet, \bullet, \ldots, \bullet]$ is a multi-frequency heterodyne phase unwrapping operation and round[•] represents a rounding function. M is the number of spatial frequencies; $\varphi_m$ (m=1, 2, 3, ..., M) represents the wrapped phase maps pertained to the spatial frequencies ($h_m$ (m=1, 2, 3, ..., M)) that sorted in an ascending order, respectively.

For the wrapped phase maps $\theta_i$ and $\theta_j$ that are pertained to the spatial frequencies $f_i$ and $f_j$, the dual-frequency heterodyne phase map $\theta_{ij}$ is calculated as follows:

$$\theta_{ij} = \begin{cases} \theta_i - \theta_j, & \theta_i \geq \theta_j \\ \theta_i - \theta_j + 2\pi, & \theta_i < \theta_j \end{cases} \quad \text{(Formula 4)}$$

The dual-frequency heterodyne unwrapping operation $[\theta_i : \theta_j]$ is performed on $\theta_i$ and $\theta_j$ as follows:

$$[\theta_i : \theta_j] = \frac{\text{round}[f_i/(f_i - f_j) \times \theta_{ij} - \theta_i/2\pi] \times 2\pi + \theta_i}{f_j/(f_i - f_j)} \quad \text{(Formula 5)}$$

therefore $[\bullet : \bullet]$ represents a dual-frequency heterodyne phase unwrapping operation.

The multi-frequency heterodyne unwrapping result of $\varphi_m$ (m=1, 2, 3, ..., M) is derived as below:

$$\begin{cases} \varphi_{1,2} = [\varphi_1 : \varphi_2] \\ \varphi_{1,3} = [\varphi_1 : \varphi_3] \\ \varphi_{1,4} = [\varphi_1 : \varphi_4] \\ \vdots \\ \varphi_{1,M} = [\varphi_1 : \varphi_4] \end{cases}$$

$$\begin{cases} \varphi_{1,2,3} = [\varphi_{1,2} : \varphi_{1,3}] \\ \varphi_{1,2,4} = [\varphi_{1,2} : \varphi_{1,4}] \\ \varphi_{1,2,5} = [\varphi_{1,2} : \varphi_{1,5}] \\ \vdots \\ \varphi_{1,2,M} = [\varphi_{1,2} : \varphi_{1,M}] \end{cases}$$

$$\vdots$$

$$\varphi_{1,2,3,\ldots,M} = [\varphi_{1,2,3,\ldots,M-2,M-1} : \varphi_{1,2,3,\ldots,M-2,M}]$$

$$[\varphi_1, \varphi_2, \varphi_3, \ldots, \varphi_M] = \frac{\varphi_{1,2,3,\ldots,M}}{h_1}$$

where $[\varphi_1, \varphi_2, \varphi_3, \ldots, \varphi_M]$ represents the multi-frequency heterodyne unwrapped phase map that pertained to the spatial frequency $h_1$.

Take the sinusoidal structured light (M=3, N=4) with the spatial frequencies of $$\frac{1}{36}, \frac{1}{35}, \text{ and } \frac{1}{30}$$

and as an example: an initial wrapped phase map corresponding to the $z^{th}$ (z=(3, 4, 5, ..., 3k) and k(=1, 2, 3, ..., +∞) represents the number of cyclically projecting loops) wrapped phase map $\varphi z$ includes: wrapped phase maps $\varphi_{z-2}, \varphi_{z-1}$ and $\varphi_z$. The wrapped phases are sorted in an ascending order according to corresponding spatial frequencies, and a target wrapped phase maps $\theta_{z1}, \theta_{z2}$ and $\theta_{z3}$ corresponding to the $z^{th}$ unwrapped phase map is obtained. Spatial frequencies corresponding to $\theta_{z1}, \theta_{z2}$ and $\theta_{z3}$ are 1/30, 1/35, and 1/36, respectively. A heterodyne unwrapped phase map corresponding to the $z^{th}$ frame of the wrapped phase $\theta_z$ is calculated as follows:

$$\theta_{z1,z2} = [\theta_{z1} : \theta_{z2}]$$
$$\theta_{z1,z3} = [\theta_{z1} : \theta_{z3}]$$
$$\theta_{z1,z2,z3} = [\theta_{z1,z2} : \theta_{z1,z3}]$$
$$\theta_z = \theta_{z1,z2,z3} \times 36$$

The multi-frequency heterodyne unwrapped phase map that pertained to the all spatial frequencies $\Phi_m$ (m=1, 2, 2, ..., M) can be calculated as follow:

$$\Phi_m = \begin{cases} [\varphi_1, \varphi_2, \varphi_3, \ldots, \varphi_M], & m = 1 \\ \text{round}\left(\left(\frac{\Phi_1}{h_m} \times h_1 - \varphi_m\right)/2\pi\right) \times 2\pi + \varphi_m, & m = 2, 3, \ldots, M \end{cases}$$

where $\varphi_m$ (m=1, 2, 3, ..., M) represents the wrapped phase maps pertained to the spatial frequencies ($h_m$ (m=1, 2, 3, ..., M)) that sorted in an ascending order, respectively.

In step S062, according to an average error effect, weighted averaging is performed on the heterodyne phase corresponding to each of the spatial frequencies in the heterodyne phase set to obtain the unwrapped phase corresponding to the target wrapped phase set.

Specifically, weighted averaging is performed on the heterodyne phase corresponding to each of the spatial frequencies in the heterodyne phase set according to Formula 6, $$\Phi = \frac{\sum_{m=1}^{M} \Phi_m}{\sum_{m=1}^{M} \frac{1}{h_m}} \quad \text{(Formula 6)}$$

where $\Phi$ is the final unwrapped phase map of multi-frequency phase unwrapping; M is the number of spatial frequencies; $\varphi_m$ (m=1, 2, ..., M) and $\Phi_m$ (m=1, 2, ..., M) represent the wrapped phase maps and multi-frequency heterodyne unwrapped phase maps pertained to spatial frequencies $h_m$ (m=1, 2, ..., M), respectively.

An example that shows the calculation of the $z^{th}$ multi-frequency unwrapped phase map with M=3 and spatial frequencies of $$\frac{1}{36}, \frac{1}{35}, \text{ and } \frac{1}{30}$$

and is taken as below.

An initial wrapped phase set corresponding to the $z^{th}$ wrapped phase map includes: wrapped phases $\theta_{z-2}$, $\theta_{z-1}$ and $\theta_z$. The wrapped phase maps are sorted in an ascending order according to corresponding spatial frequencies, and a target wrapped phase map set $\theta_{z1}$, $\theta_{z2}$ and $\theta_{z3}$ corresponding to the $z^{th}$ wrapped phase map is obtained. Spatial frequencies corresponding to $\theta_{z1}$, $\theta_{z2}$ and $\theta_{z3}$ are $\frac{1}{30}$, $\frac{1}{35}$, and $\frac{1}{36}$. A triple-frequency heterodyne phase map corresponding to the $z^{th}$ wrapped phase map is calculated as follows:

$$\theta_{z1,z2} = [\theta_{z1}:\theta_{z2}]$$

$$\theta_{z1,z3} = [\theta_{z1}:\theta_{z3}]$$

$$\theta_{z1,z2,z3} = [\theta_{z1,z2}:\theta_{z1,z3}]$$

$$\theta_z = \theta_{z1,z2,z3} \times 36$$

$$\Phi_{z2} = \text{round}\left[\left(\frac{35 \times \Phi_{z1}}{36} - \theta_{z2}\right)/2\pi\right] \times 2\pi + \theta_{z2}$$

$$\Phi_{z3} = \text{round}\left[\left(\frac{30 \times \Phi_{z1}}{36} - \theta_{z3}\right)/2\pi\right] \times 2\pi + \theta_{z3}$$

$$\Phi_{final} = \frac{\Phi_{z1} + \Phi_{z2} + \Phi_{z3}}{36 + 35 + 30}$$

where $\Phi_{z1}$, $\Phi_{z2}$ and $\Phi_{z3}$ are unwrapped phase maps corresponding to spatial frequencies of $\frac{1}{36}$, $\frac{1}{35}$, and $\frac{1}{30}$; $\Phi_{final}$ is the triple-frequency heterodyne unwrapped phase map corresponding to an $z^{th}$ wrapped phase map $\theta_z$; and an unwrapped phase sequence $\{\Phi_3:\Phi_4:\Phi_5: \ldots :\Phi_{3\times k}\}$ with a length of $3k-2$ is obtained.

Finally, it is also to be noted that in this specification, relational terms such as "first" and "second" are only used to distinguish one entity or operation from another entity or operation, and do not necessarily require or imply that there is any such an actual relationship or order between these entities or operations. Moreover, the terms "including", "containing" or any other variations are intended to cover non-exclusive inclusion, so that a process, method, article or device including a series of elements includes not only those elements, but also other elements not explicitly listed or elements inherent to such a process, method, article or device. Without further restrictions, an element defined by the phrase "including one" does not exclude the existence of other identical elements in the process, method, article or device including the element.

Various examples are described in this specification in a progressive manner, with each example focusing on differences from the other examples. The same and similar parts among the various examples can only be referred to each other.

The previous description of the disclosed examples is provided to enable those skilled in the art to implement or use the present application. Many modifications to these examples will be obvious to those skilled in the art, and the general principles defined herein can be implemented in other examples without departing from the spirit or scope of the present application. Therefore, the present application is not limited to the examples shown herein, but is to be accorded the widest scope consistent with the principles and novel features disclosed herein.

The invention claimed is:

1. A structured light three-dimensional measurement method based on joint multi-frequency heterodyne and time-gated overlapping coding strategy, applied to a three-dimensional measurement system, the three-dimensional measurement system comprising a computation module, a projector module and an image acquisition module, and the three-dimensional measurement method comprising:
   generating at least two groups of sinusoidal fringe images that have a fixed number of phase-shifting steps but different spatial frequencies by using the computation module, and uploading a sinusoidal fringe image set to the projector module;
   projecting images collected from the sinusoidal fringe image set onto an interrogated target in a continuous loop by using the projector module;
   synchronously capturing fringe images modulated by a surface of the target by using the image acquisition module, and uploading the same to the computation module;
   grouping images in the fringe image set according to the number of phase-shifting steps by using the computation module, and calculating a wrapped phase map pertained to each group of fringe images by using the phase-shifting method to obtain a wrapped phase map sequence;
   extracting each wrapped phase map by using the time-gated overlapping coding strategy, and sorting the wrapped phase maps according to the spatial frequency to obtain a target wrapped phase map;
   calculating an unwrapped phase map obtained from the phase map set by using the multi-frequency heterodyne method to obtain an unwrapped phase map sequence; and
   computing a three-dimensional point cloud from each of the unwrapped phase maps according to the properties of similar triangles in conjunction with calibration parameters.

2. The structured light three-dimensional measurement method based on joint multi-frequency heterodyne and time-gated overlapping coding strategy according to claim 1, wherein the extracting each wrapped phase map by using the time-gated overlapping coding strategy comprises:
   extracting wrapped phase maps with the number of M ranging from a $(z-M+1)^{th}$ wrapped phase map to a wrapped phase map, $z=(M, M+1, M+2, \ldots, k \times M)$, M being the number of spatial frequencies and $k(=1, 2, 3, \ldots, +\infty)$ representing the number of cyclically projecting loops.

3. The structured light three-dimensional measurement method based on joint multi-frequency heterodyne and time-gated overlapping coding strategy according to claim 1, wherein the calculating a wrapped phase map pertained to each group of fringe images by using the phase-shifting method comprises:
   calculating the wrapped phase map corresponding to each group of fringe images according to Formula 2, $$\theta(x, y) = \arctan\left(\frac{\sum_{n=o}^{N-1} I_n(x, y)\sin(2\pi n/N)}{\sum_{n=o}^{N-1} I_n(x, y)\cos(2\pi n/N)}\right), \quad \text{(Formula 2)}$$

where (x,y) represents a pixel coordinate; N is the number of phase-shifting steps; and $I_n$ ($n=0, 1 \ldots, N-1$) represents the fringe images in each group.

4. The structured light three-dimensional measurement method based on joint multi-frequency heterodyne and time-gated overlapping coding strategy according to claim 1, wherein the calculating an unwrapped phase map obtained from the phase map set by using the multi-frequency heterodyne method comprises:

calculating the unwrapped phase map obtained from the wrapped phase map set by using the multi-frequency heterodyne method to obtain an unwrapped phase map sequence according to Formula 3:

$$\Phi_m = \begin{cases} [\varphi_1, \varphi_2, \varphi_3, \ldots, \varphi_M], m = 1 \\ \text{round}\left(\left(\frac{\Phi_1}{h_m} \times h_1 - \varphi_m\right)/2\pi\right) \times 2\pi + \varphi_m, m = 2, 3, \ldots, M \end{cases} \quad \text{(Formula 3)}$$

where [•, •, . . . , •] represents the multi-frequency heterodyne phase unwrapping operation and round[•] represents a rounding function, M being the number of spatial frequencies; $\varphi_m$ (m=1, 2, . . . , M) and $\Phi_m$ (m=1, 2, . . . , M) represent the wrapped phase maps and heterodyne unwrapped phase maps pertained to spatial frequencies $h_m$ (m=1, 2, . . . , M), respectively.

5. The structured light three-dimensional measurement method based on the joint multi-frequency heterodyne and time-gated overlapping coding strategy according to claim 4, wherein a heterodyne phase between any two wrapped phases with different spatial frequencies in the target wrapped phase map set is calculated according to Formulas 4 and 5:

for the wrapped phase maps $\theta_i$ and $\theta_j$ that are pertained to the spatial frequencies fi and fj, a dual-frequency heterodyne phase map $\theta_{ij}$ is calculated as follows:

$$\theta_{ij} = \begin{cases} \theta_i - \theta_j, \theta_i \geq \theta_j \\ \theta_i - \theta_j + 2\pi, \theta_i < \theta_j \end{cases} ; \quad \text{(Formula 4)}$$

and a dual-frequency heterodyne unwrapping operation [$\theta_i$:$\theta_j$] is performed as follows:

$$[\theta_i:\theta_j] = \frac{\text{round}[f_i/(f_i - f_j) \times \theta_{ij} - \theta_i/2\pi] \times 2\pi + \theta_i}{f_j/(f_i - f_j)} \quad \text{(Formula 5)}$$

where [•:•] represents the dual-frequency heterodyne phase unwrapping operation.

6. The structured light three-dimensional measurement method based on joint multi-frequency heterodyne and time-gated overlapping coding strategy according to claim 5, wherein weighted averaging is performed on the multi-frequency heterodyne unwrapped phase maps corresponding to each of the spatial frequencies according to the averaging-error effect comprises:

performing, according to Formula 6, weighted averaging on the multi-frequency heterodyne unwrapped phase map corresponding to each of the spatial frequencies, $$\Phi = \frac{\sum_{m=1}^{M} \Phi_m}{\sum_{m=1}^{M} \frac{1}{h_m}} \quad \text{(Formula 6)}$$

where $\Phi$ is the final unwrapped phase map of multi-frequency phase unwrapping, M is the number of spatial frequencies; $\varphi_m$ (m=1, 2, . . . , M) and $\Phi_m$ (m=1, 2, . . . , M) represent the wrapped phase maps and multi-frequency heterodyne unwrapped phase maps pertained to spatial frequencies $h_m$ (m=1, 2, . . . , M), respectively.

\* \* \* \* \*